(12) United States Patent
Ke et al.

(10) Patent No.: US 11,671,126 B2
(45) Date of Patent: *Jun. 6, 2023

(54) ANTENNA MODULE, TERMINAL, CONTROL METHOD AND DEVICE AND STORAGE MEDIUM

(71) Applicant: BEIJING XIAOMI MOBILE SOFTWARE CO., LTD., Beijing (CN)

(72) Inventors: Changqing Ke, Beijing (CN); Jiang Xiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 242 days.

This patent is subject to a terminal disclaimer.

(21) Appl. No.: 17/152,674

(22) Filed: Jan. 19, 2021

(65) Prior Publication Data

US 2021/0143849 A1 May 13, 2021

Related U.S. Application Data

(63) Continuation of application No. 16/586,093, filed on Sep. 27, 2019, now Pat. No. 10,931,319.

(30) Foreign Application Priority Data

Apr. 30, 2019 (CN) .......................... 201910363070.6

(51) Int. Cl.
*H04B 1/00* (2006.01)
*H04B 1/04* (2006.01)
(Continued)

(52) U.S. Cl.
CPC ........... *H04B 1/0475* (2013.01); *H01Q 1/243* (2013.01); *H01Q 23/00* (2013.01)

(58) Field of Classification Search
CPC ....... H04B 1/0475; H01Q 1/243; H01Q 23/00
(Continued)

(56) References Cited

U.S. PATENT DOCUMENTS 6,300,911 B1 * 10/2001 Murray .................. H01Q 1/243
343/900
8,554,149 B2 * 10/2013 Mashino ................ H04B 7/024
455/67.11
(Continued)

FOREIGN PATENT DOCUMENTS

| CN | 101789796 A | 7/2010 |
| CN | 102696149 A | 9/2012 |

(Continued)

OTHER PUBLICATIONS

Notice of Allowance in CN Application No. 201910363070.6 (CNNOA) dated Jul. 6, 2022.
(Continued)

*Primary Examiner* — Yuwen Pan
*Assistant Examiner* — Max Mathew
(74) *Attorney, Agent, or Firm* — Syncoda LLC; Feng Ma

(57) ABSTRACT

An antenna module for a terminal includes an antenna and a Radiated Spurious Emission (RSE) improvement component. The antenna includes a feed source, a ground point, and at least one radiation arm. The RSE improvement component is coupled to the antenna for suppressing high order harmonics generated by the antenna when the antenna operates in a target frequency band, and includes a radio frequency switch having a terminal connected to the at least one target radiation arm, and another terminal connected to the ground point; or, the radio frequency switch is connected in series into the at least one target radiation arm of the
(Continued)

antenna. The at least one target radiation arm is a radiation arm by which the antenna radiates the high order harmonics outward.

7 Claims, 6 Drawing Sheets

(51) Int. Cl.
  *H01Q 1/24* (2006.01)
  *H01Q 23/00* (2006.01)
(58) Field of Classification Search
  USPC ............................................. 455/63.11
  See application file for complete search history.

(56) References Cited

U.S. PATENT DOCUMENTS

| | | | | |
|---|---|---|---|---|
| 8,706,056 | B2* | 4/2014 | Saji ................ | H04B 1/006 455/333 |
| 8,874,061 | B2* | 10/2014 | Huang ............ | H04B 1/1036 455/296 |
| 10,236,872 | B1* | 3/2019 | Willard ........... | H03K 17/0412 |
| 10,505,530 | B2* | 12/2019 | Ranta ............. | H03K 17/6874 |
| 10,886,911 | B2* | 1/2021 | Willard ........... | H01L 27/1203 |
| 2009/0181735 | A1* | 7/2009 | Griffin, Jr. ...... | H01Q 1/244 455/575.7 |
| 2010/0019884 | A1* | 1/2010 | Moritani ......... | H01Q 1/243 340/10.1 |
| 2011/0102290 | A1* | 5/2011 | Milosavljevic ... | H01Q 9/145 343/852 |
| 2011/0175789 | A1* | 7/2011 | Lee ................. | H01Q 1/243 333/17.1 |
| 2011/0300820 | A1* | 12/2011 | Uejima ........... | H04B 1/18 455/192.1 |
| 2013/0229316 | A1* | 9/2013 | Chen ............... | H01Q 5/378 343/729 |
| 2015/0214995 | A1* | 7/2015 | Kanemaru ....... | H04B 1/0458 455/83 |
| 2016/0079656 | A1 | 3/2016 | Tsai et al. | |
| 2016/0344100 | A1* | 11/2016 | Onaka ............. | H01Q 5/335 |
| 2017/0026136 | A1 | 1/2017 | Thompson et al. | |
| 2017/0047651 | A1* | 2/2017 | Zuniga ............ | H01Q 1/243 |
| 2017/0069955 | A1* | 3/2017 | Kasar ............. | H01Q 1/40 |
| 2017/0142723 | A1* | 5/2017 | Li .................. | H04L 5/001 |
| 2018/0214049 | A1* | 8/2018 | Carron ............ | A61B 5/6861 |
| 2019/0319352 | A1* | 10/2019 | Gonzalez ........ | H01Q 21/30 |
| 2019/0379124 | A1* | 12/2019 | Zou ................. | H01Q 9/065 |
| 2020/0021317 | A1* | 1/2020 | Kim ................ | H01Q 9/14 |
| 2020/0350934 | A1* | 11/2020 | Ke .................. | H01Q 23/00 |

FOREIGN PATENT DOCUMENTS

| | | |
|---|---|---|
| CN | 105897280 A | 8/2016 |
| CN | 106998233 A | 8/2017 |
| CN | 107017916 A | 8/2017 |
| CN | 107395250 A | 11/2017 |
| CN | 108281781 A | 7/2018 |
| CN | 108337013 A | 7/2018 |
| CN | 109039369 A | 12/2018 |
| JP | 2012175591 A | 9/2012 |

OTHER PUBLICATIONS

1st Office Action in CN Application No. 201910363070.6 (CNOA1) dated Sep. 23, 2021.
Liu Wei et al., Spurious Emissions Control Methods for Mobile Phone; Dec. 25, 2020; Safety & EMC; as Cited in CNNOA.
U.S. Non-Final Office Action in U.S. Appl. No. 17/152,717, dated Nov. 14, 2022.

* cited by examiner

ANTENNA MODULE, TERMINAL, CONTROL METHOD AND DEVICE AND STORAGE MEDIUM

CROSS-REFERENCE TO RELATED APPLICATIONS

The present application is a continuation of U.S. patent application Ser. No. 16/586,093 filed on Sep. 27, 2019, which claims priority to Chinese Patent Application No. 201910363070.6 filed on Apr. 30, 2019. The disclosures of these applications are hereby incorporated by reference in their entirety.

BACKGROUND

A terminal having a wireless communication function, such as a mobile phone, is usually equipped with an antenna through which a radio frequency signal is transmitted and received.

Radiated Spurious Emission (RSE) test is an important test, which may need to be conducted for terminal certification in various countries. Typically, technicians reduce the transmission power of a terminal antenna and thereby reduce the spurious emission of the terminal, so as to satisfy the requirements of the RSE test.

SUMMARY

The present disclosure relates generally to antenna technologies, and more specifically to an antenna module, a terminal, a control method, a control device and a storage medium.

Embodiments of the present disclosure provide an antenna module, a terminal, a control method, a control device and a storage medium.

According to a first aspect of embodiments of the present disclosure, there is provided an antenna module. The antenna module is applied to a terminal. The antenna module includes an antenna and a Radiated Spurious Emission (RSE) improvement component;

wherein:

the antenna includes a feed source, a ground point, and at least one radiation arm;

the RSE improvement component is coupled to the antenna for suppressing high order harmonics generated by the antenna when the antenna operates in a target frequency band.

According to some embodiments, the RSE improvement component includes a radio frequency switch, a terminal of the radio frequency switch is connected to the at least one target radiation arm of the antenna, and another terminal of the radio frequency switch is connected to the ground point; or, the radio frequency switch is connected in series into the at least one target radiation arm of the antenna;

wherein the at least one target radiation arm is a radiation arm by which the antenna radiates the high order harmonics outward.

According to some embodiments, the RSE improvement component includes a filter circuit and a control switch, the filter circuit is configured to suppress the high order harmonics, and the control switch is configured to control a working state of the filter circuit.

According to some embodiments, the filter circuit is a band stop filter circuit;

wherein the band stop filter circuit is connected in series into the at least one target radiation arm of the antenna; or, a terminal of the band stop filter circuit is connected to the at least one target radiation arm of the antenna, and another terminal of the band stop filter circuit is connected to the feed source; wherein the at least one target radiation arm is a radiation arm by which the antenna radiates the high order harmonics outward;

wherein the control switch is connected in parallel with the band stop filter circuit.

According to some embodiments, the filter circuit is a band pass filter circuit;

wherein a terminal of the band pass filter circuit is connected to the at least one target radiation arm of the antenna, and another terminal of the band pass filter circuit is connected to the ground point of the antenna; wherein the at least one target radiation arm is a radiation arm by which the antenna radiates the high order harmonics outward;

wherein the control switch is connected in series with the band pass filter circuit.

According to some embodiments, the antenna is formed on a flexible circuit, and the RSE improvement component is integrated in the flexible circuit.

According to a second aspect of embodiments of the present disclosure, there is provided a terminal. The terminal includes a processing component and an antenna module. The antenna module includes an antenna and a Radiated Spurious Emission (RSE) improvement component;

wherein:

the antenna includes a feed source, a ground point, and at least one radiation arm;

the RSE improvement component is coupled to the antenna for suppressing high order harmonics generated by the antenna when the antenna operates in a target frequency band;

the processing component is configured to control the RSE improvement component to be in a working state when the antenna operates in the target frequency band.

According to some embodiments, the RSE improvement component includes a radio frequency switch, a terminal of the radio frequency switch is connected to the at least one target radiation arm of the antenna, another terminal of the radio frequency switch is connected to the ground point of the antenna, and the at least one target radiation arm is a radiation arm by which the antenna radiates the high order harmonics outward; wherein the processing component is configured to control the radio frequency switch to be turned on when the antenna operates in the target frequency band; or wherein the radio frequency switch is connected in series into the at least one target radiation arm of the antenna, the at least one target radiation arm is a radiation arm by which the antenna radiates the high order harmonics outward, and the processing component is configured to control the radio frequency switch to be turned off when the antenna operates in the target frequency band.

According to some embodiments, the RSE improvement component includes a filter circuit and a control switch, the filter circuit is configured to suppress the high order harmonics, and the control switch is configured to control a working state of the filter circuit.

According to some embodiments, the filter circuit is a band stop filter circuit;

wherein the band stop filter circuit is connected in series into the at least one target radiation arm of the antenna; or, a terminal of the band stop filter circuit is connected to the at least one target radiation arm of the antenna, and another terminal of the band stop filter circuit is connected to the feed source; wherein the at least one target radiation arm is a radiation arm by which the antenna radiates the high order harmonics outward;

wherein the control switch is connected in parallel with the band stop filter circuit;

wherein the processing component is configured to control the control switch to be turned off when the antenna operates in the target frequency band.

According to some embodiments, the filter circuit is a band pass filter circuit;

wherein a terminal of the band pass filter circuit is connected to the at least one target radiation arm of the antenna, and another terminal of the band pass filter circuit is connected to the ground point of the antenna; wherein the at least one target radiation arm is a radiation arm by which the antenna radiates the high order harmonics outward;

wherein the control switch is connected in series with the band pass filter circuit;

wherein the processing component is configured to control the control switch to be turned on when the antenna operates in the target frequency band.

According to a third aspect of embodiments of the present disclosure, there is provided a control method. The control method is applied in a processing component of a terminal. An antenna module of the terminal includes an antenna and a Radiated Spurious Emission (RSE) improvement component;

wherein the method includes:

obtaining a working frequency band of the antenna; and controlling the RSE improvement component to be in a working state when the working frequency band of the antenna is a target frequency band;

wherein the RSE improvement component is configured to suppress high order harmonics generated by the antenna.

According to some embodiments, the RSE improvement component includes a radio frequency switch, a terminal of the radio frequency switch is connected to the at least one target radiation arm of the antenna, another terminal of the radio frequency switch is connected to the ground point of the antenna, and the at least one target radiation arm is a radiation arm by which the antenna radiates the high order harmonics outward;

wherein controlling the RSE improvement component to be in a working state, includes:

controlling the radio frequency switch to be turned on.

According to some embodiments, the RSE improvement component includes a radio frequency switch, the radio frequency switch is connected in series into the at least one target radiation arm of the antenna, and the at least one target radiation arm is a radiation arm by which the antenna radiates the high order harmonics outward;

wherein controlling the RSE improvement component to be in a working state, includes:

controlling the radio frequency switch to be turned off.

According to some embodiments, the RSE improvement component includes a filter circuit and a control switch, and the filter circuit is configured to suppress the high order harmonics;

wherein controlling the RSE improvement component to be in a working state, includes:

controlling the control switch to switch the filter circuit to a working state.

According to some embodiments, the filter circuit is a band stop filter circuit;

wherein the band stop filter circuit is connected in series into the at least one target radiation arm of the antenna; or, a terminal of the band stop filter circuit is connected to the at least one target radiation arm of the antenna, and another terminal of the band stop filter circuit is connected to the feed source; wherein the at least one target radiation arm is a radiation arm by which the antenna radiates the high order harmonics outward, and the control switch is connected in parallel with the band stop filter circuit;

wherein controlling the RSE improvement component to be in a working state, includes:

controlling the control switch to be turned off.

According to some embodiments, the filter circuit is a band pass filter circuit;

wherein a terminal of the band pass filter circuit is connected to the at least one target radiation arm of the antenna, and another terminal of the band pass filter circuit is connected to the ground point of the antenna; wherein the at least one target radiation arm is a radiation arm by which the antenna radiates the high order harmonics outward, and the control switch is connected in series with the band pass filter circuit;

wherein controlling the RSE improvement component to be in a working state, includes:

controlling the control switch to be turned on.

According to a fourth aspect of embodiments of the present disclosure, there is provided a control device. The control device is applied in a processing component of a terminal. An antenna module of the terminal includes an antenna and a Radiated Spurious Emission (RSE) improvement component;

wherein the control device includes:

an obtaining module configured to obtain a working frequency band of the antenna; and a control module configured to control the RSE improvement component to be in a working state when the working frequency band of the antenna is a target frequency band;

wherein the RSE improvement component is configured to suppress high order harmonics generated by the antenna.

According to some embodiments, the RSE improvement component includes a radio frequency switch, a terminal of the radio frequency switch is connected to the at least one target radiation arm of the antenna, another terminal of the radio frequency switch is connected to the ground point of the antenna, and the at least one target radiation arm is a radiation arm by which the antenna radiates the high order harmonics outward;

wherein the control module is configured to control the radio frequency switch to be turned on.

According to some embodiments, the RSE improvement component includes a radio frequency switch, the radio frequency switch is connected in series into the at least one target radiation arm of the antenna, and the at least one target radiation arm is a radiation arm by which the antenna radiates the high order harmonics outward;

wherein the control module is configured to control the radio frequency switch to be turned off.

According to some embodiments, the RSE improvement component includes a filter circuit and a control switch, and the filter circuit is configured to suppress the high order harmonics;

wherein the control module is configured to control the control switch to switch the filter circuit to a working state.

According to some embodiments, the filter circuit is a band stop filter circuit;

wherein the band stop filter circuit is connected in series into the at least one target radiation arm of the antenna; or, a terminal of the band stop filter circuit is connected to the at least one target radiation arm of the antenna, and another terminal of the band stop filter circuit is connected to the feed source; wherein the at least one target radiation arm is a radiation arm by which the antenna radiates the high order harmonics outward, and the control switch is connected in parallel with the band stop filter circuit;

wherein the control module is configured to control the control switch to be turned off.

According to some embodiments, the filter circuit is a band pass filter circuit;

wherein a terminal of the band pass filter circuit is connected to the at least one target radiation arm of the antenna, and another terminal of the band pass filter circuit is connected to the ground point of the antenna; wherein the at least one target radiation arm is a radiation arm by which the antenna radiates the high order harmonics outward, and the control switch is connected in series with the band pass filter circuit;

wherein the control module is configured to control the control switch to be turned on.

According to a fifth aspect of embodiments of the present disclosure, there is provided a non-transitory computer readable storage medium having computer programs stored thereon, wherein the computer programs are executed by a processing component to perform steps of the method according to the third aspect.

Various embodiments of the present disclosure can have one or more of the following advantages.

By adding an RSE improvement component to the antenna module to suppress the high order harmonics generated by the antenna, reduction of the transmission power of the antenna is not needed. Thus, the RSE problem can be solved, while the communication performance of the terminal can be ensured.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain principles of various embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The inventors of the present disclosure have recognized that reducing the transmission power of the antenna can affect the communication performance of the terminal.

The cause of RSE can be that in the case of high power, active devices generate high order harmonics due to non-linearity, especially the third harmonic. The harmonic is radiated to the far field, which makes the RSE of a terminal exceeds what a standard specifies. In the technical solutions provided by embodiments of the present disclosure, the high order harmonics generated by the terminal antenna are suppressed, so that the terminal satisfies the RSE requirement without reducing the transmission power of the antenna.

In embodiments of the present disclosure, the terminal may be various handheld devices (such as mobile phones, tablet computers) having wireless communication functions, in-vehicle devices, wearable devices, computing devices, smart home devices, or other processing devices connected to the wireless modem, and various forms of user equipment (UE), mobile station (MS), terminal device (terminal device) and the like. For convenience of description, in the embodiments of the present disclosure, the devices mentioned above are collectively referred to as terminals.

The terminal can have, for example, a display such as liquid-crystal display (LCD) or organic light-emitting diode (OLED) display, a microphone, and other components such as multimedia components for interacting with the user.

Figure 1:
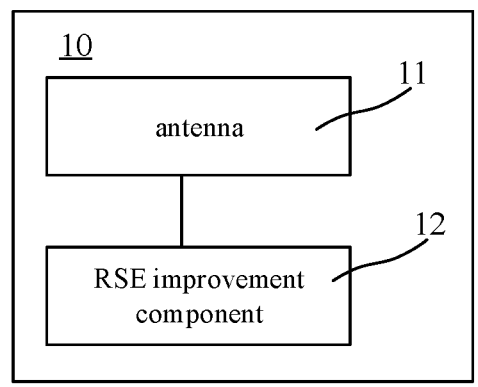
FIG. 1 is a schematic diagram of an antenna module according to some embodiments.

FIG. 1 is a schematic diagram of an antenna module according to some embodiments. The antenna module 10 is applied to a terminal. The antenna module 10 can include an antenna 11 and an RSE improvement component 12.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

The antenna 11 includes a feed source, a ground point, and at least one radiation arm. The radiation arm is a portion of the antenna 11 for radiating electromagnetic waves outward. The feed source is used to feed the radio frequency signals to the radiation arm. For example, the feed source can be coupled to a radio frequency circuit of the antenna 11 for receiving radio frequency signals from the radio frequency circuit and transmitting the radio frequency signals through the radiation arm.

In some embodiments of the present disclosure, the number of radiation arms included in the antenna 11 is not limited. For example, the antenna 11 can include one radiation arm, or can include a plurality of radiation arms. In addition, in the embodiments of the present disclosure, the operating frequency bands of the respective radiation arms included in the antenna 11 are not limited, and the operating frequency bands of the respective radiation arms can be designed according to actual needs. As an example, the antenna 11 includes two radiation arms, one of the radiation arms is used for radiating a low frequency signal and the other one of the radiation arms is used for radiating a high frequency signal.

The RSE improvement component 12 is coupled to the antenna 11 for suppressing the high order harmonics generated by the antenna 11 when the antenna 11 operates in a target frequency band. For example, the high order harmonics may refer to second harmonics or higher order harmonics. When the antenna 11 operates in the target frequency band, the RSE improvement component 12 is controlled to be in a working state to suppress the high order harmonics generated by the antenna 11. When the antenna 11 operates in a non-target frequency band (i.e., when the antenna 11 operates in other frequency bands than the target frequency band), the RSE improvement component 12 can be controlled to be in a non-working state.

Assuming that the frequency at which the terminal's transmission power is high is Freq1, the frequency of the high order harmonics is Freq2=n×Freq1 (n>2 and n is an integer). Assuming that n is 3, Freq2 is the frequency of the third harmonic. When the antenna 11 resonates at Freq1, the radiation efficiency of the antenna 11 for the harmonic Freq2 deteriorates. Under such condition, the spurious signal cannot be easily radiated through the antenna 11, avoiding the RSE exceeding the standard. This ensures that the third harmonic of Freq1 cannot be radiated to the far field through the antenna 11 when the terminal transmits high power at Freq1. In this way, the RSE performance can be optimized without affecting the transmission of Freq1.

As an example, when the terminal works in GSM850 and GSM900, the transmission power is very high, and it is easy to generate the problem that the RSE exceeds the standard. When designing the antenna, the technician ensures that when the antenna works in the GSM850 and GSM900 frequency bands, the radiation efficiency of the antenna in its third harmonic (about 2.5 GHz and 2.7 GHz, respectively) is very poor, and the problem of RSE exceeding the standard can be solved. For example, when the terminal works in the GSM900 frequency band, the RSE improvement component is controlled to shift the resonance of about 2.7 GHz, so that the third harmonic cannot be radiated to the far field, thereby solving the problem of the RSE exceeding the standard.

Figure 2:
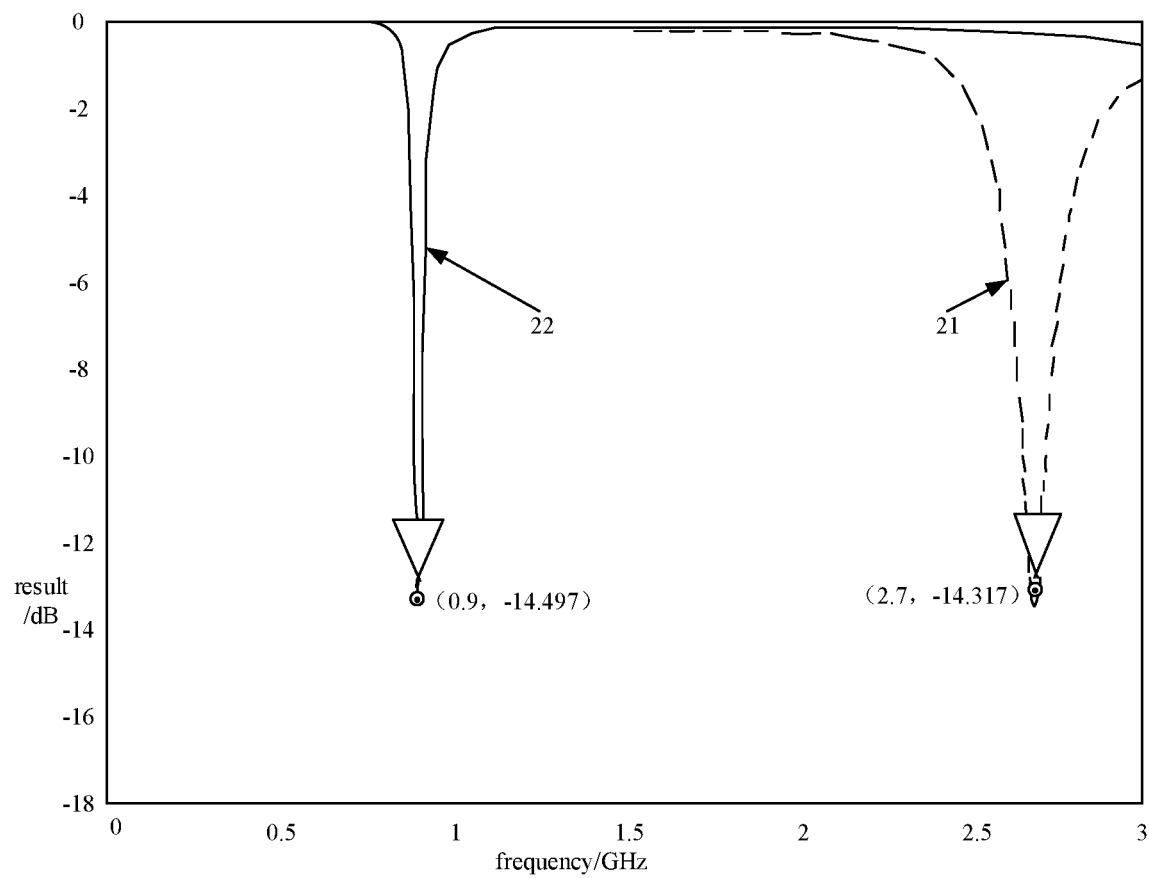
FIG. 2 illustrates a schematic diagram of an antenna resonance curve.

As shown in FIG. 2, in the case where the RSE improvement component 12 is not added to the antenna module 10, the resonance curve 21 when the antenna 11 operates in the target frequency band (for example, a frequency band of about 0.9 GHz) is shown by a broken line in the figure. As can be seen from the resonance curve 21, the antenna 11 has a significant third harmonic, that is, the signal at about 2.7 GHz. In the case where the RSE improvement component 12 is added to the antenna module 10, the resonance curve 22 when the antenna 11 operates in the target frequency band (such as the frequency band of about 0.9 GHz) is shown by the solid line in the FIG. 2. As can be seen from the figure, the third harmonic is suppressed by the RSE improvement component 12 and cannot be radiated to the far field.

In the embodiments of the present disclosure, the type of the antenna 11 is not limited. For example, the antenna 11 can be as a monopole antenna, a T-shaped antenna, an inverted-F antenna (IFA), or a planar inverted-F antenna (PIFA), and so on. In addition, in the embodiments of the present disclosure, process for forming the antenna 11 is not limited. For example, the antenna 11 can be a Laser Direct Structuring (LDS) antenna or a Flexible Printed Circuit (FPC) antenna, and the like.

According to some embodiments, the antenna 11 is formed on a flexible circuit and the RSE improvement component 12 is integrated in the flexible circuit. The flexible circuit is a special circuit in which electronic components are mounted on a flexible substrate. The flexible circuit has the characteristics of light weight, thin thickness, softness and flexibility. Forming the antenna 11 on the flexible circuit can facilitate integration of the RSE improvement component 12 into the flexible circuit, and such arrangement is free to install and has a small footprint.

In view of the above, in the technical solutions provided by the embodiments of the present disclosure, by adding an RSE improvement component to the antenna module to suppress the high order harmonics generated by the antenna, reduction of the transmission power of the antenna is not needed. Thus, the RSE problem can be solved, while the communication performance of the terminal can be ensured.

In the following, possible implementations of the RSE improvement component 12 will be described by way of several embodiments.

In one example, the RSE improvement component 12 includes a radio frequency (RF) switch. The radio frequency switch is an electronic component used to enable on and off of a radio frequency signal.

Figure 3:
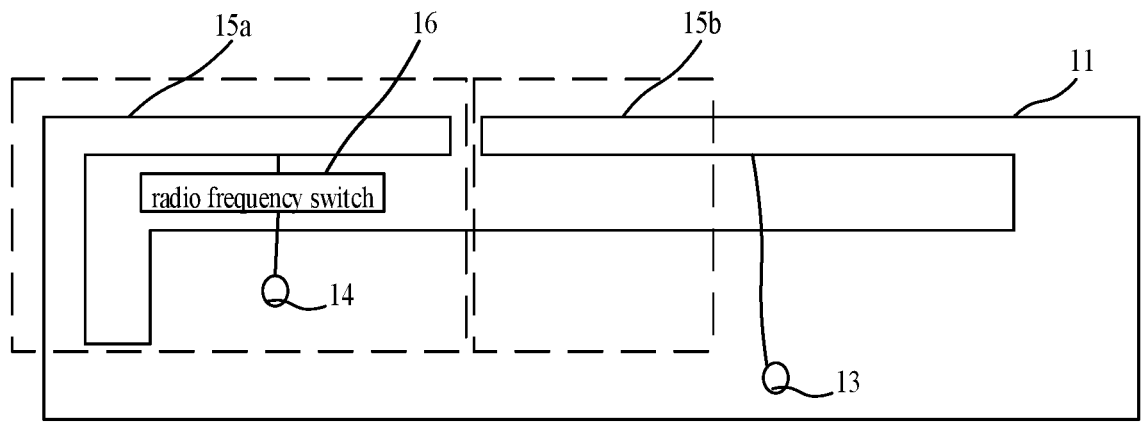
FIG. 3 illustrates a schematic diagram of a radio frequency switch and an antenna.

In some implementations, as shown in FIG. 3, the antenna 11 includes a feed source 13, a ground point 14, and at least one radiation arm (including a first radiation arm 15a and a second radiation arm 15b in FIG. 3). A terminal of the radio frequency switch 16 is connected to the target radiation arm of the antenna 11, and another terminal of the radio frequency switch 16 is connected to the ground point 14. The target radiation arm is a radiation arm by which the antenna 11 radiates high order harmonics outward. When the antenna 11 is operating in the target frequency band, the radio frequency switch 16 is turned on, and the high order harmonics on the target radiation arm are grounded, thereby filtering the higher harmonics.

In the example of FIG. 3, the first radiation arm 15a can be used to radiate high frequency signals outward, and the second radiation arm 15b can be used to radiate low frequency signals or medium and high frequency signals outward. A gap is formed between the first radiation arm 15a and the second radiation arm 15b. When the antenna 11 radiates a low frequency signal such as 900 MHz outward through the second radiation arm 15b, high order harmonics (such as third harmonics) of the low frequency signal are likely to be emitted from the target radiation arm indicated by the broken line frame in FIG. 3. By adding the radio frequency switch 16 between the target radiation arm and the ground point 14, when the antenna 11 operates in the 900 MHz frequency band, the radio frequency switch 16 is controlled to be turned on, and the high order harmonics of the low frequency signal can be filtered out.

Figure 4:
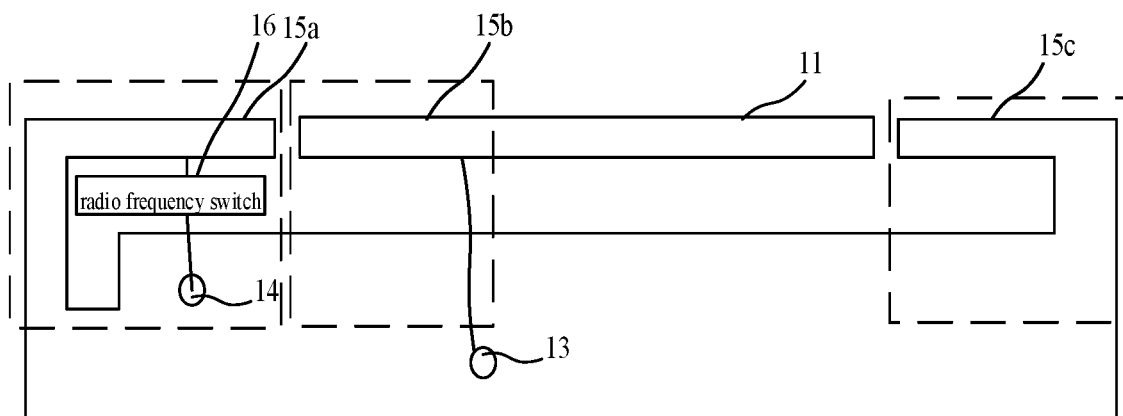
FIG. 4 illustrates another schematic diagram of a radio frequency switch and an antenna.

In the example of FIG. 4, the antenna 11 includes a feed source 13, a ground point 14, and three radiation arms, i.e., a first radiation arm 15a, a second radiation arm 15b, and a third radiation arm 15c. The first radiation arm 15a and the third radiation arm 15c can be used to radiate high frequency signals outward, and the second radiation arm 15*b* can be used to radiate low frequency signals outward. When the antenna 11 radiates a low frequency signal such as 900 MHz outward through the second radiation arm 15*b*, high order harmonics (such as third harmonics) of the low frequency signal are likely to be emitted from the target radiation arm indicated by the broken line frame in FIG. 4. By adding the radio frequency switch 16 between the target radiation arm and the ground point 14, when the antenna 11 operates in the 900 MHz frequency band, the radio frequency switch 16 is controlled to be turned on, and the high order harmonics of the low frequency signal can be filtered out.

Figure 5:
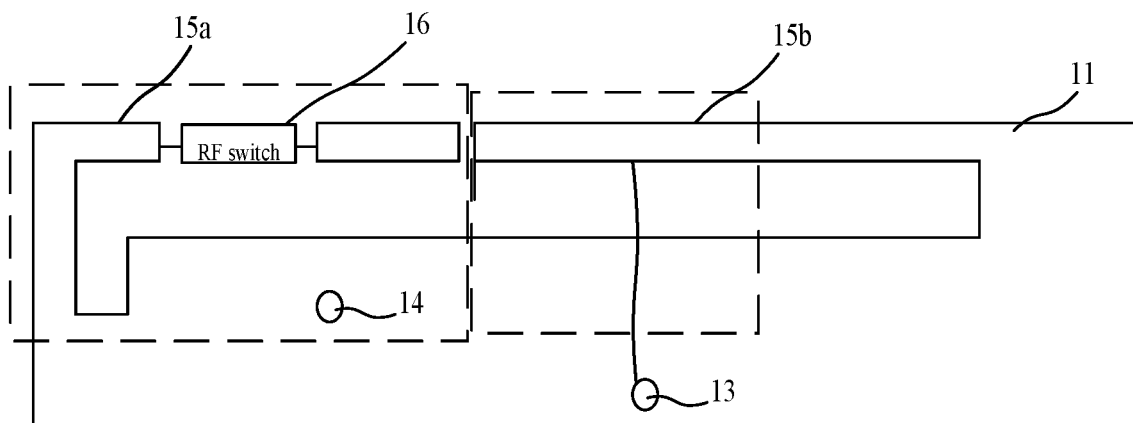
FIG. 5 illustrates another schematic diagram of a radio frequency switch and an antenna.

In some other implementations, as shown in FIG. 5, the antenna 11 includes a feed source 13, a ground point 14, and at least one radiation arm (including a first radiation arm 15*a* and a second radiation arm 15*b* in FIG. 5). The radio frequency switch 16 is connected in series into the target radiation arm of the antenna 11. In other words, it can be considered that the target radiation arm is split into two parts, and then both terminals of the radio frequency switch 16 are connected in series between the two parts. The target radiation arm is a radiation arm of the antenna 11 radiating high order harmonics outward. When the antenna 11 is operating in the target frequency band, the radio frequency switch 16 is turned off, and at this time, the radiation arm for radiating the high order harmonics is broken, and the higher harmonics cannot be radiated to the far field, thereby suppressing the high order harmonics.

In the example of FIG. 5, the first radiation arm 15*a* can be used to radiate a high frequency signal outward, and the second radiation arm 15*b* can be used to radiate a low frequency signal or a medium high frequency signal outward. A gap is formed between the first radiation arm 15*a* and the second radiation arm 15*b*. When the antenna 11 radiates a low frequency signal such as 900 MHz outward through the second radiation arm 15*b*, high order harmonics (such as third harmonics) of the low frequency signal are likely to be emitted from the target radiation arm indicated by the broken line frame in FIG. 5. By connecting the radio frequency switch 16 in series into the target radiation arm, when the antenna 11 operates in the 900 MHz frequency band, the radio frequency switch 16 is controlled to be disconnected, the radiation arm for radiating the high order harmonics is broken, and the high order harmonics cannot be radiated to the far field, and thus it is possible to suppress the high order harmonics of the low frequency signal.

Figure 6:
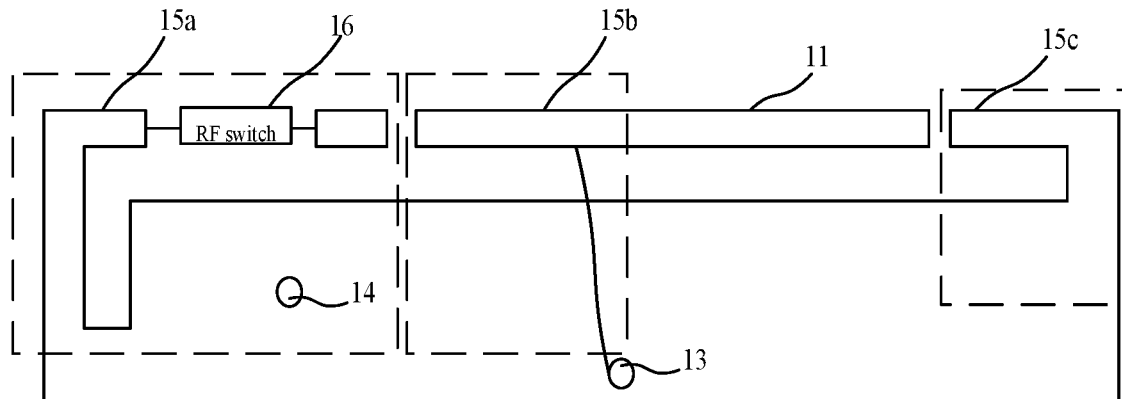
FIG. 6 illustrates another schematic diagram of a radio frequency switch and antenna.

In the example of FIG. 6, the antenna 11 includes a feed source 13, a ground point 14, and three radiation arms, i.e., a first radiation arm 15*a*, a second radiation arm 15*b*, and a third radiation arm 15*c*. The first radiation arm 15*a* and the third radiation arm 15*c* can be used to radiate high frequency signals outward, and the second radiation arm 15*b* can be used to radiate low frequency signals outward. When the antenna 11 radiates a low frequency signal such as 900 MHz outward through the second radiation arm 15*b*, high order harmonics (such as third harmonics) of the low frequency signal are likely to be emitted from the target radiation arm indicated by the broken line frame in FIG. 6. By connecting the radio frequency switch 16 in series into the target radiation arm, when the antenna 11 operates in the 900 MHz frequency band, the radio frequency switch 16 is controlled to be disconnected, the radiation arm for radiating the high order harmonics is broken, and the high order harmonics cannot be radiated to the far field and thus it is possible to suppress the high order harmonics of the low frequency signal.

In another example, the RSE improvement component 12 includes a filter circuit and a control switch. The filter circuit is used to suppress high order harmonics, and the control switch is used to control the working state of the filter circuit. For example, the control switch can control the filter circuit to switch between a working state and a non-working state.

In some implementations, the filter circuit is a band stop filter circuit. The band stop filter circuit can suppress signals in a certain frequency band and allow signals outside the band to pass.

Figure 7:
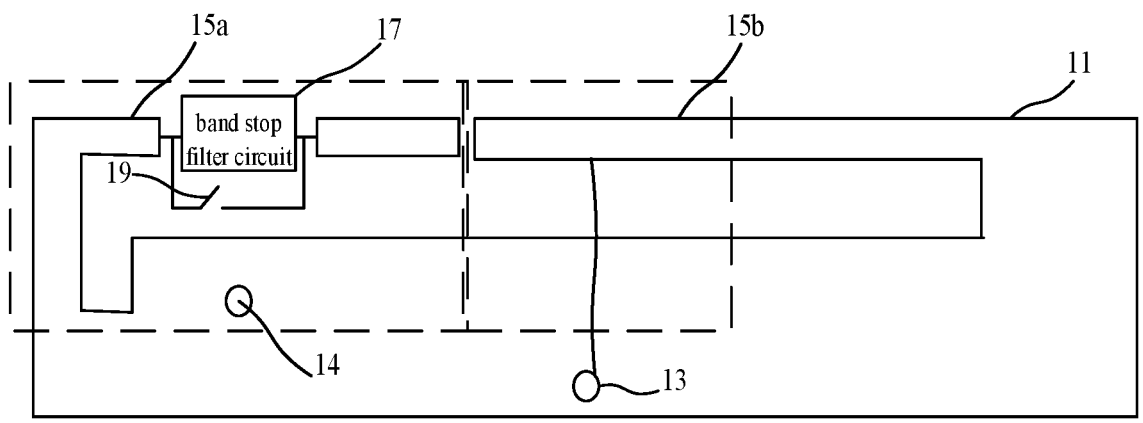
FIG. 7 illustrates a schematic diagram of a band stop filter circuit, a control switch, and an antenna.

In one example, as shown in FIG. 7, the antenna 11 includes a feed source 13, a ground point 14, and at least one radiation arm (including a first radiation arm 15*a* and a second radiation arm 15*b* in FIG. 7). The band stop filter circuit 17 is connected in series into the target radiation arm of the antenna 11. A control switch 19 is connected in parallel with the band stop filter circuit 17. That is, it can be considered that the target radiation arm is split into two portions, and both terminals of the band stop filter circuit 17 are connected in series between the two portions. The target radiation arm is a radiation arm of the antenna 11 radiating high order harmonics outward. When the antenna 11 operates in the target frequency band, the control switch 19 is turned off, the band stop filter circuit 17 is in a working state, and the band stop filter circuit 17 performs filtering of the high order harmonics.

Figure 8:
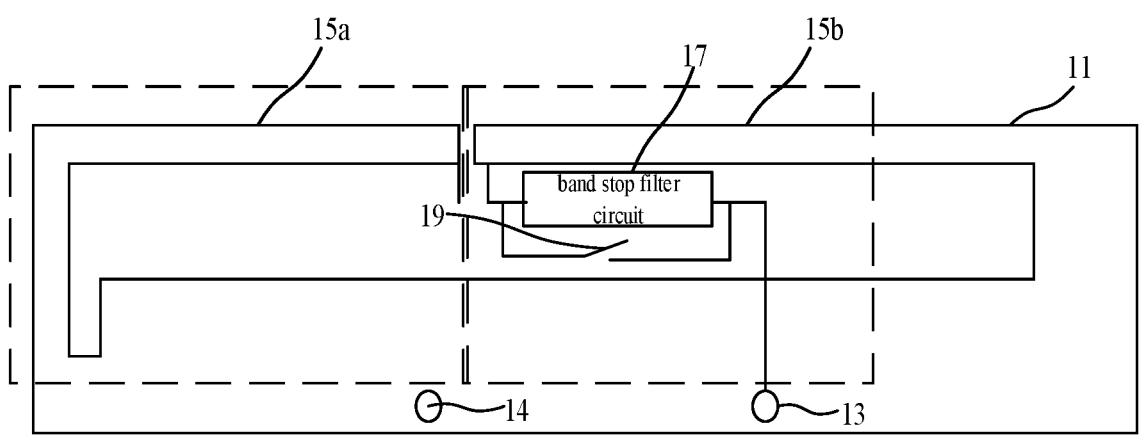
FIG. 8 illustrates another schematic diagram of a band stop filter circuit, a control switch, and an antenna.

In another example, as shown in FIG. 8, the antenna 11 includes a feed source 13, a ground point 14, and at least one radiation arm (including a first radiation arm 15*a* and a second radiation arm 15*b* in FIG. 8). A terminal of the band stop filter circuit 17 is connected to the target radiation arm of the antenna 11, and another terminal of the band stop filter circuit 17 is connected to the feed source 13. The control switch 19 is connected in parallel with the band stop filter circuit 17. The target radiation arm is a radiation arm of the antenna 11 radiating high order harmonics outward. When the antenna 11 operates in the target frequency band, the control switch 19 is turned off, the band stop filter circuit 17 is in a working state, and the band stop filter circuit 17 performs filtering of the high order harmonics.

Figure 9:
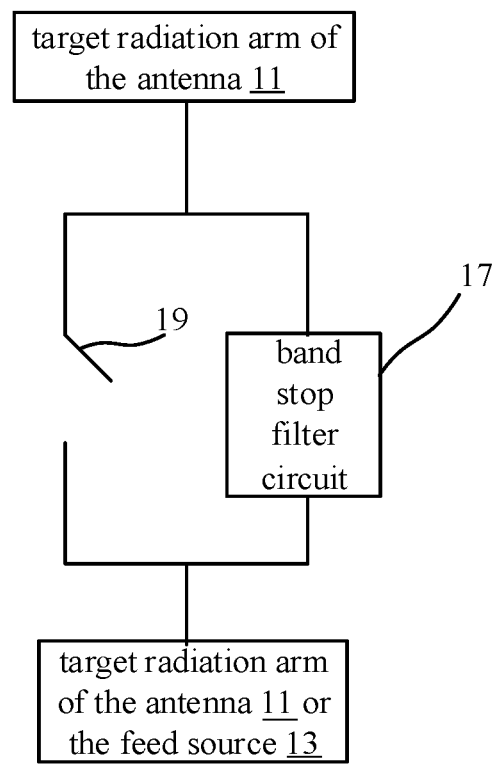
FIG. 9 illustrates another schematic diagram of a band stop filter circuit, a control switch, and an antenna.

The two connection modes of the band stop filter circuit 17 introduced above can be summarized as shown in FIG. 9. In one connection mode, the band stop filter circuit 17 is connected in series into the target radiation arm of the antenna 11. In another connection mode, a terminal of the band stop filter circuit 17 is connected to the target radiation arm of the antenna 11, and another terminal of the band stop filter circuit 17 is connected to the feed source 13. The control switch 19 and the band stop filter circuit 17 are connected in parallel. When the control switch 19 is turned off, the band stop filter circuit 17 is in a working state; when the control switch 19 is turned on, the band stop filter circuit 17 is in a non-working state.

In some other implementations, the filter circuit is a band pass filter circuit. The band pass filter circuit can allow signals in a certain frequency band to pass, and suppress signals outside the band.

Figure 10:
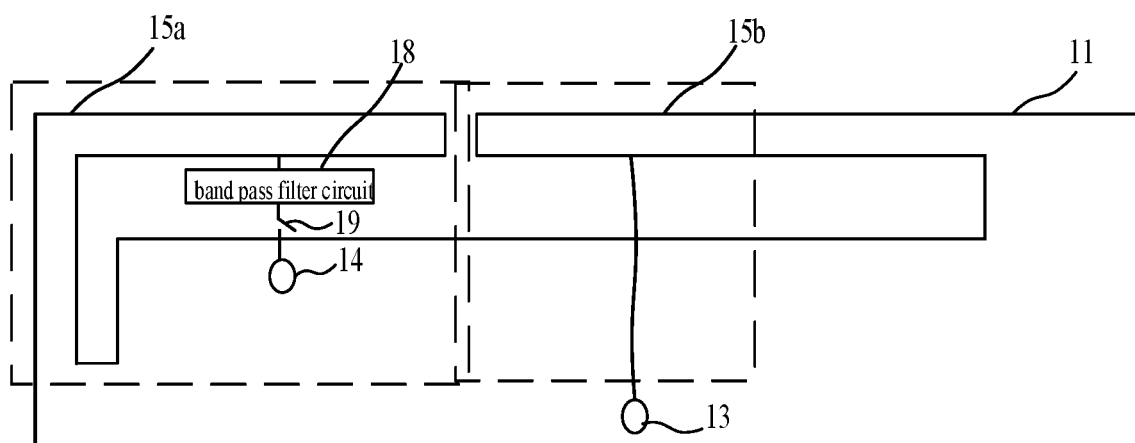
FIG. 10 illustrates a schematic diagram of a band pass filter circuit, a control switch, and an antenna.

For example, as shown in FIG. 10, the antenna 11 includes a feed source 13, a ground point 14, and at least one radiation arm (including a first radiation arm 15*a* and a second radiation arm 15*b* in FIG. 10). A terminal of the band pass filter circuit 18 is connected to the target radiation arm of the antenna 11, and another terminal of the band pass filter circuit 18 is connected to the ground point 14. A control switch 19 is connected in series with the band pass filter circuit 18. The target radiation arm is a radiation arm of the antenna 11 radiating high order harmonics outward. When the antenna 11 is operating in the target frequency band, the control switch 19 is turned on, the band pass filter circuit 18 is in a working state, and the band pass filter circuit 18 grounds the high order harmonics on the target radiation arm to filter the high order harmonics.

Figure 11:
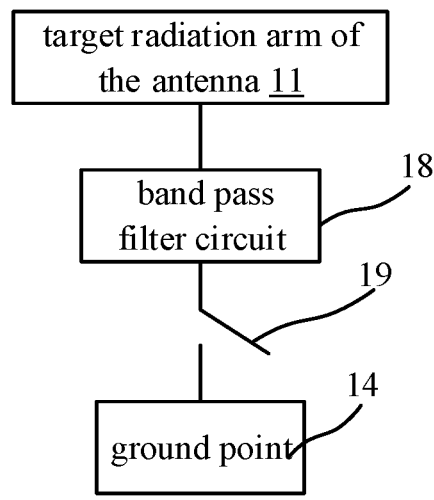
FIG. 11 illustrates another schematic diagram of a band pass filter circuit, a control switch, and an antenna.

The connection mode of the band pass filter circuit 18 described above can be as shown in FIG. 11. A terminal of the band pass filter circuit 18 is connected to the target radiation arm of the antenna 11, and another terminal of the band pass filter circuit 18 is connected to the ground point 14. The control switch 19 is connected in series with the band pass filter circuit 18. When the control switch 19 is turned on, the band pass filter circuit 18 is in a working state; when the control switch 19 is turned off, the band pass filter circuit 18 is in a non-working state.

In view of the above, some embodiments of the present disclosure can provide two possible implementations of the RSE improvement component. One implementation is realized by the radio frequency switch, the structure is simple, and the circuit complexity is low. The other implementation is realized by the filter circuit and the control switch, and such implementation can accurately filter the high order harmonics of the low frequency signal and allow other high frequency signals to pass, which helps to meet the requirement of CA (Carrier Aggregation).

In addition, the working state of the radio frequency switch and the filter circuit can be flexibly controlled. When the antenna operates in a low power scenario, since the spurious source is small, the radio frequency switch or the filter circuit can be controlled to be inoperative. In this way, the antenna can operate in both the low frequency band and the high frequency, thereby meeting the needs of the CA.

Figure 12:
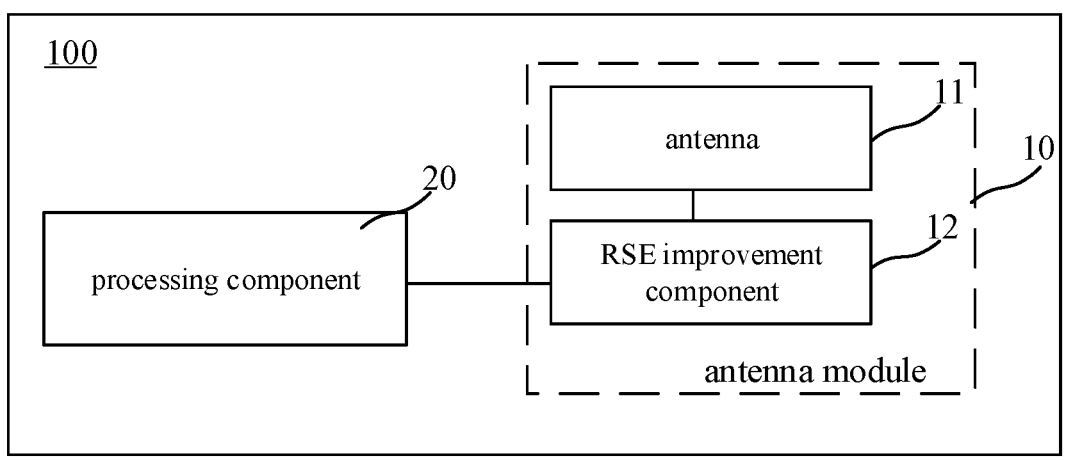
FIG. 12 is a block diagram of a terminal according to some embodiments.

FIG. 12 is a block diagram of a terminal according to some embodiments. As shown in FIG. 12, the terminal 100 can include a processing component 20 and an antenna module 10.

The antenna module 10 includes an antenna 11 and an RSE improvement component 12. The antenna 11 includes a feed source, a ground point, and at least one radiation arm. The RSE improvement component 12 is coupled to the antenna 11 for suppressing the high order harmonics generated by the antenna 11 when the antenna 11 operates in the target frequency band.

The descriptions regarding the antenna module 10 can be found in the above descriptions regarding previous embodiments and repeated descriptions are omitted.

The processing component 20 can be a processor of the terminal 100, such as a CPU (Central Processing Unit), or other component having computing and processing functions. The processing component 20 can be coupled to the RSE improvement component 12 for controlling the working state of the RSE improvement component 12. The processing component 20 is configured to control the RSE improvement component 12 to be in a working state when the antenna 11 operates in the target frequency band.

In one example, the RSE improvement component 12 includes a radio frequency switch. A terminal of the radio frequency switch is connected to the target radiation arm of the antenna 11, and another terminal of the radio frequency switch is connected to the ground point. The processing component 20 is configured to control the radio frequency switch to be turned on when the antenna 11 operates in the target frequency band. In another example, the radio frequency switch is connected in series into the target radiation arm of the antenna 11, and the processing component 20 is configured to control the radio frequency switch to be turned off when the antenna 11 operates in the target frequency band.

In another example, the RSE improvement component includes a filter circuit and a control switch. If the filter circuit is a band stop filter circuit and the control switch is connected in parallel with the band stop filter circuit, the processing component 20 is configured to control the control switch to be turned off when the antenna 11 operates in the target frequency band. If the filter circuit is a band pass filter circuit and the control switch is connected in series with the band pass filter circuit, the processing component 20 is configured to control the control switch to be turned on when the antenna 11 operates in the target frequency band.

Detailed description of various possible implementations of the RSE improvement component 12 can be found in the above descriptions regarding the previous embodiments, and repeated descriptions are omitted here.

In view of the above, in some embodiments of the present disclosure, by adding an RSE improvement component to the antenna module to suppress the high order harmonics generated by the antenna, reduction of the transmission power of the antenna is not needed. Thus, the RSE problem can be solved, while the communication performance of the terminal can be ensured.

In addition, the processing component controls the working state of the RSE improvement component to achieve a high flexibility.

Figure 13:
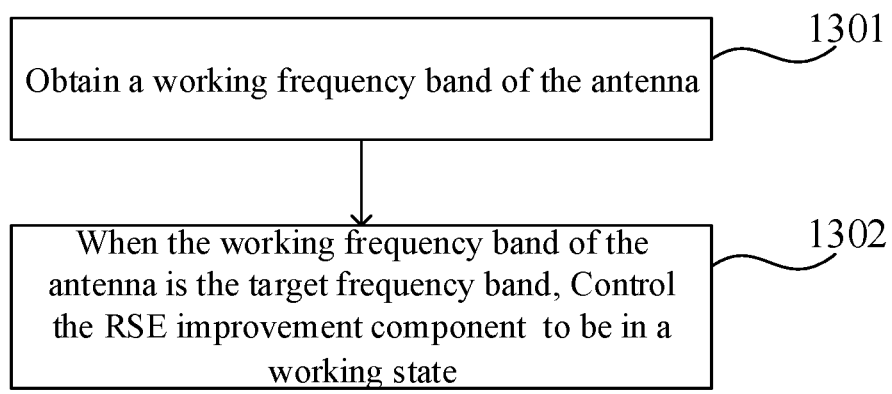
FIG. 13 is a flowchart of a control method according to some embodiments.

FIG. 13 is a flowchart of a control method according to some embodiments. The method is applicable to the processing component of the terminal in the above embodiments. The method can include the following steps:

In step 1301, a working frequency band of the antenna is obtained.

In step 1302, when the working frequency band of the antenna is the target frequency band, the RSE improvement component is controlled to be in a working state.

In some embodiments of the present disclosure, the terminal includes an antenna and an RSE improvement component. The descriptions regarding the antenna and the RSE improvement component can be found in the above descriptions regarding foregoing embodiments, and repeated descriptions are omitted. High order harmonics are generated when the antenna of the terminal operates at the target frequency band with high power. In the embodiments of the present disclosure, the RSE improvement component is added to the antenna module of the terminal, and when the antenna of the terminal works in the target frequency band, the RSE improvement component is controlled to be in a working state to suppress the high order harmonics generated by the antenna, thereby solving the RSE problem.

In some embodiments, the RSE improvement component includes a radio frequency switch. A terminal of the radio frequency switch is connected to the target radiation arm of the antenna, and another terminal of the radio frequency switch is connected to the ground point. The target radiation arm is a radiation arm by which the antenna radiates the high order harmonics outward. In this way, when the working frequency band of the antenna is the target frequency band, the processing component controls the radio frequency switch to be turned on, so as to filter the high order harmonics generated by the antenna.

In some other embodiments, the RSE improvement component includes a radio frequency switch. The radio frequency switch is connected in series into the target radiation arm of the antenna. The target radiation arm is a radiation arm by which the antenna radiates the high order harmonics outward. In this way, when the working frequency band of the antenna is the target frequency band, the processing component controls the radio frequency switch to be disconnected to break the radiation arm for radiating the high order harmonics, and the higher harmonic cannot be radiated to the far field, thereby solving the RSE problem.

In yet some other embodiments, the RSE improvement component includes a filter circuit and a control switch. The filter circuit is configured to filter high order harmonics. When the working frequency band of the antenna is the target frequency band, the processing component controls the above control switch to switch the filter circuit to the working state, so as to filter out the high order harmonics generated by the antenna.

If the filter circuit is a band stop filter circuit, the band stop filter circuit is connected in series into the target radiation arm of the antenna; or one terminal of the band stop filter circuit is connected to the target radiation arm of the antenna, the other terminal of the band stop filter circuit is connected to the feed point of the antenna. The target radiation arm is a radiation arm by which the antenna radiates high order harmonics outward. The control switch is connected in parallel with the band stop filter circuit. When the working frequency band of the antenna is the target frequency band, the processing component controls the above-mentioned control switch to be disconnected (i.e., turned off), so that the high order harmonics generated by the antenna can be filtered.

If the filter circuit is a band pass filter circuit, one terminal of the band pass filter circuit is connected to the target radiation arm of the antenna, and the other terminal of the band pass filter circuit is connected to the ground point of the antenna. The target radiation arm is a radiation arm by which the antenna radiates high order harmonics. The control switch is connected in series with the band pass filter circuit. When the working frequency band of the antenna is the target frequency band, the processing component controls the above-mentioned control switch to be turned on, so that the high order harmonics generated by the antenna can be filtered.

For details of the method embodiments, reference can be made to the above apparatus examples.

In view of the above, in the technical solutions provided by the embodiments of the present disclosure, by adding an RSE improvement component to the antenna module to suppress the high order harmonics generated by the antenna, reduction of the transmission power of the antenna is not needed. Thus, the RSE problem can be solved, while the communication performance of the terminal can be ensured.

In addition, the working state of the RSE improvement component can be flexibly controlled. When the antenna operates in a low power scenario, since the spurious source is small, the RSE improvement component can be controlled to be inoperative, so that the antenna can operates in both low frequency band and high frequency band at the same time so as to meet the needs of CA.

In some embodiments, devices can be provided to implement the method embodiments of the present disclosure. For details not disclosed in the device embodiments, refer to the previous description regarding the method or product embodiments.

Figure 14:
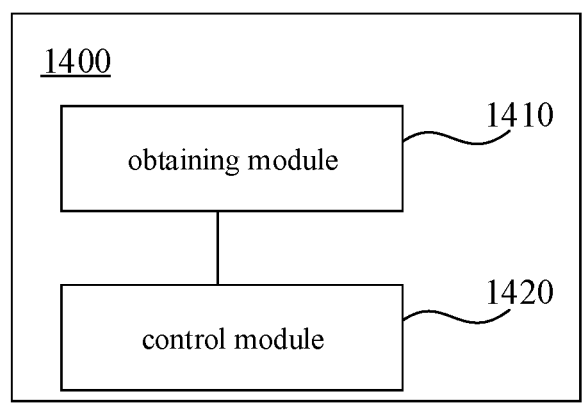
FIG. 14 is a block diagram of a control device according to some embodiments.

FIG. 14 is a block diagram of a control device according to some embodiments. The device has a function of implementing the above-described method embodiments. The function may be implemented by hardware including processing circuits, software, or a combination thereof. The device may be the processing component described above, or the device may be disposed in the processing component. As shown in FIG. 14, the device 1400 can include an obtaining module 1410 and a control module 1420.

The obtaining module 1410 is configured to obtain a working frequency band of the antenna.

The control module 1420 is configured to control the RSE improvement component to be in a working state when the working frequency band of the antenna is the target frequency band.

The RSE improvement component is configured to suppress high harmonics generated by the antenna.

In view of the above, in the technical solutions provided by the embodiments of the present disclosure, by adding an RSE improvement component to the antenna module to suppress the high order harmonics generated by the antenna, reduction of the transmission power of the antenna is not needed. Thus, the RSE problem can be solved, while the communication performance of the terminal can be ensured.

In some embodiments, the RSE improvement component includes a radio frequency switch. A terminal of the radio frequency switch is connected to the target radiation arm of the antenna, and another terminal of the radio frequency switch is connected to the ground point of the antenna. The target radiation arm is a radiation arm by which the antenna radiates the high order harmonics.

The control module 1420 is configured to control the radio frequency switch to be turned on.

In some embodiments, the RSE improvement component includes a radio frequency switch. The radio frequency switch is connected in series into the target radiation arm of the antenna. The target radiation arm is a radiation arm by which the antenna radiates the high order harmonics.

The control module 1420 is configured to control the radio frequency switch to be turned off.

In some embodiments, the RSE improvement component includes a filter circuit and a control switch. The filter circuit is configured to suppress the high order harmonics.

The control module 1420 is configured to control the control switch to switch the filter circuit to a working state.

In some embodiments, the filter circuit is a band stop filter circuit. The band stop filter circuit is connected in series into the target radiation arm of the antenna; or a terminal of the band stop filter circuit is connected to the target radiation arm of the antenna, and another terminal of the band stop filter circuit is connected to the feed point of the antenna. The target radiation arm is a radiation arm by which the antenna radiates the high order harmonics outward. The control switch is connected in parallel with the band stop filter circuit.

The control module 1420 is configured to control the control switch to be turned off.

In some embodiments, the filter circuit is a band pass filter circuit. A terminal of the band pass filter circuit is connected to the target radiation arm of the antenna, and another terminal of the band pass filter circuit is connected to the ground point of the antenna. The target radiation arm is a radiation arm by which the antenna radiates the high order harmonics. The control switch is connected in series with the band pass filter circuit.

The control module 1420 is configured to control the control switch to be turned on.

It should be noted that the division of the functional modules described above when the device provided by the foregoing embodiments implements its function is only an example, and in actual applications, the functions may be completed by different functional modules according to actual needs. The structure of the device is divided into different functional modules to complete all or part of the functions described above.

With regard to the device embodiments, the specific manner in which the respective modules perform the operations has been described in detail in the method embodiments, and repeated descriptions will be omitted.

Embodiments of the present disclosure also provide a non-transitory computer readable storage medium having stored thereon computer programs. The computer programs are executed by a processing component (such as a processor) of a terminal to implement the above control methods.

According to some embodiments, the non-transitory computer readable storage medium can be a ROM (Read-Only Memory), a RAM (Random Access Memory), a CD-ROM, a magnetic tape, a floppy disk, or an optical data storage device, or the like.

It should be understood that "a plurality of" mentioned herein means two or more. The term "and/or" describes the association relationship of associated objects, indicating that there may be three relationships. For example, A and/or B may indicate that there are three cases: A exists only, both A and B exist, and B exists only. The character "/" generally indicates that the contextual objects are in an "or" relationship. As used herein, "connected" may mean directly connected or indirectly connected.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. An antenna module, applied to a terminal, wherein the antenna module comprises an antenna and a Radiated Spurious Emission (RSE) improvement component;
   wherein:
   the antenna comprises a feed source, a ground point, and at least one radiation arm;
   the RSE improvement component is coupled to the antenna for suppressing high order harmonics generated by the antenna when the antenna operates in a target frequency band;
   wherein the RSE improvement component comprises a radio frequency switch, a terminal of the radio frequency switch is connected to the at least one target radiation arm of the antenna, and another terminal of the radio frequency switch is connected to the ground point; or, the radio frequency switch is connected in series into the at least one target radiation arm of the antenna;
   wherein the at least one target radiation arm is a radiation arm by which the antenna radiates the high order harmonics outward.

2. The antenna module according to claim 1, wherein the antenna is formed on a flexible circuit, and the RSE improvement component is integrated in the flexible circuit.

3. A terminal, comprising a processing circuit and an antenna module, wherein the antenna module comprises an antenna and a Radiated Spurious Emission (RSE) improvement component;
   wherein:
   the antenna comprises a feed source, a ground point, and at least one radiation arm;
   the RSE improvement component is coupled to the antenna for suppressing high order harmonics generated by the antenna when the antenna operates in a target frequency band;
   the processing circuit is configured to control the RSE improvement component to be in a working state when the antenna operates in the target frequency band;
   wherein the RSE improvement component comprises a radio frequency switch, a terminal of the radio frequency switch is connected to the at least one target radiation arm of the antenna, another terminal of the radio frequency switch is connected to the ground point, and the at least one target radiation arm is a radiation arm by which the antenna radiates the high order harmonics outward; wherein the processing circuit is configured to control the radio frequency switch to be turned on when the antenna operates in the target frequency band; or
   wherein the radio frequency switch is connected in series into the at least one target radiation arm of the antenna, the at least one target radiation arm is a radiation arm by which the antenna radiates the high order harmonics outward, and the processing circuit is configured to control the radio frequency switch to be turned off when the antenna operates in the target frequency band.

4. The terminal according to claim 3, wherein the antenna is formed on a flexible circuit, and the RSE improvement component is integrated in the flexible circuit.

5. A control method, applied in a processing circuit of a terminal, wherein an antenna module of the terminal comprises an antenna and a Radiated Spurious Emission (RSE) improvement component;
   wherein the method comprises:
   obtaining a working frequency band of the antenna; and
   controlling the RSE improvement component to be in a working state when the working frequency band of the antenna is a target frequency band;
   wherein the RSE improvement component is configured to suppress high order harmonics generated by the antenna; and
   wherein the RSE improvement component comprises a radio frequency switch, a terminal of the radio frequency switch is connected to the at least one target radiation arm of the antenna, another terminal of the radio frequency switch is connected to the ground point of the antenna, and the at least one target radiation arm is a radiation arm by which the antenna radiates the high order harmonics outward.

6. The control method according to claim 5, wherein the controlling the RSE improvement component to be in a working state comprises:
   controlling the radio frequency switch to be turned on.

7. The control method according to claim 5, wherein the antenna is formed on a flexible circuit, and the RSE improvement component is integrated in the flexible circuit.

* * * * *